United States Patent
Druma

(10) Patent No.: US 12,544,126 B2
(45) Date of Patent: Feb. 10, 2026

(54) ACCESS AND ABLATION SYSTEM AND METHOD FOR USE THEREOF

(71) Applicant: Medtronic Europe Sàrl, Tolochenaz (CH)

(72) Inventor: Calin Druma, Sunnyvale, CA (US)

(73) Assignee: Medtronic Europe Sàrl, Tolochenaz (CH)

( * ) Notice: Subject to any disclaimer, the term of this patent is extended or adjusted under 35 U.S.C. 154(b) by 947 days.

(21) Appl. No.: 17/545,593

(22) Filed: Dec. 8, 2021

(65) Prior Publication Data
US 2023/0172656 A1 Jun. 8, 2023

(51) Int. Cl.
*A61B 18/14* (2006.01)
*A61B 18/16* (2006.01)
*A61B 18/00* (2006.01)

(52) U.S. Cl.
CPC ...... *A61B 18/1477* (2013.01); *A61B 18/1487* (2013.01); *A61B 18/16* (2013.01);
(Continued)

(58) Field of Classification Search
CPC ............ A61B 18/1477; A61B 18/1487; A61B 2018/0044
See application file for complete search history.

(56) References Cited

U.S. PATENT DOCUMENTS 6,283,951 B1 * 9/2001 Flaherty ........... A61B 17/12172
604/164.11
6,478,793 B1 * 11/2002 Cosman ................. A61B 34/20
606/49
(Continued)

FOREIGN PATENT DOCUMENTS

EP 1059067 12/2000
WO 2014071161 5/2014

OTHER PUBLICATIONS

Intraosseous basivertebral nerve ablation for the treatment of chronic low back pain: a prospective randomized double-blind sham-controlled multi-center study, European Spine Journal (2018) 27:1146-1156, Feb. 8, 2018.
(Continued)

*Primary Examiner* — Linda C Dvorak
*Assistant Examiner* — Ryan T Clark
(74) *Attorney, Agent, or Firm* — Carter, DeLuca & Farrel

(57) ABSTRACT

An access and radio-frequency (RF) ablation system and method for use thereof is provided. The access and RF ablation system can include an RF ablation probe, a stylet, a cannula, a needle, and a drill. The method of using the access and radio-frequency ablation system can include inserting portions of a combined stylet into a patient's body to create a pathway therethrough and position a distal end of the stylet and a distal end of the cannula adjacent hard and/or soft tissues requiring ablation or tissues adjacent thereto; pushing portions of the needle into, through, and out of an interior cavity of the cannula to position a curved distal end of the needle adjacent the distal end of the cannula in the pathway; lengthening the pathway in an angled and curved direction relative to a mid-longitudinal axis of the cannula by pushing the curved distal end portion of the needle further into the hard and/or soft tissues requiring ablation or the tissues adjacent thereto; guiding a drill using the needle to enlarge and/or further lengthen the pathway in the hard and/or soft tissues requiring ablation or the tissues adjacent thereto in an angled and curved direction relative to the mid-longitudinal axis of the cannula; pushing portions of the RF ablation probe into, through, and out of the cannula and into and through the pathway to position a distal end portion of the RF ablation probe adjacent the hard and/or soft tissues requiring ablation; and activating the RF ablation probe to
(Continued)

ablate all or portions of the hard and/or soft tissues requiring ablation.

12 Claims, 10 Drawing Sheets

(52) U.S. Cl.
CPC .............. *A61B 2018/00202* (2013.01); *A61B 2018/0044* (2013.01); *A61B 2018/00577* (2013.01); *A61B 2018/00601* (2013.01)

(56) References Cited

U.S. PATENT DOCUMENTS

| | | | |
|---|---|---|---|
| 7,349,743 B2 | 3/2008 | Tadlock | |
| 8,100,896 B2 | 1/2012 | Podhajsky | |
| 8,425,507 B2 | 4/2013 | Pellegrino et al. | |
| 9,168,047 B2 | 10/2015 | To et al. | |
| 9,320,535 B2 | 4/2016 | Zaretzka et al. | |
| 9,717,551 B2 | 8/2017 | Krueger et al. | |
| 9,950,164 B2 | 4/2018 | Lipani | |
| 10,292,719 B2 | 5/2019 | Burger et al. | |
| 10,478,246 B2 | 11/2019 | Pellegrino et al. | |
| 10,624,652 B2 | 4/2020 | Germain et al. | |
| 10,729,490 B2 | 8/2020 | Godara et al. | |
| 10,736,688 B2 | 8/2020 | Wright et al. | |
| 2005/0033292 A1 | 2/2005 | Teitelbaum et al. | |
| 2005/0240201 A1* | 10/2005 | Yeung | A61B 17/1604 606/108 |
| 2014/0236144 A1 | 8/2014 | Krueger et al. | |
| 2014/0243943 A1 | 8/2014 | Rao et al. | |
| 2015/0305800 A1 | 10/2015 | Trieu | |
| 2016/0331443 A1* | 11/2016 | Phan | A61B 17/1671 |
| 2017/0049503 A1 | 2/2017 | Cosman et al. | |
| 2019/0231368 A1 | 8/2019 | Aho et al. | |
| 2019/0290314 A1 | 9/2019 | Gemer et al. | |
| 2020/0383707 A1 | 12/2020 | Kidman et al. | |
| 2021/0113238 A1 | 4/2021 | Donovan | |

OTHER PUBLICATIONS

International Search Report and Written Opinion dated Feb. 24, 2023 from International Application No. PCT/EP2022/083262.

* cited by examiner

ACCESS AND ABLATION SYSTEM AND METHOD FOR USE THEREOF

FIELD

The present technology generally relates to an access and radio-frequency (RF) ablation system and method for use thereof that affords access to hard and/or soft tissues requiring ablation and ablation of those tissues.

BACKGROUND

Nerve pain due to degenerative disease and spinal metastases can be common causes of severe pain among patients with back pain. RF ablation using RF ablation probes has been successfully used for the palliative treatment of painful spinal metastases. As such, there is increased interest in the medical community to apply a similar procedure to treat nerve pain due to degenerative disease. Typically, RF ablation probes used for palliative treatment of spinal metastases tend to be straight and direct RF energy distally due to being either monopolar or bipolar. However, treatment of nerve pain due to degenerative disease may require access to areas not accessible by straight RF ablation probes and direction of RF energy in directions other than distally. Therefore, there is a need for an access and ablation system and method for use thereof that can access areas not accessible by straight RF ablation probes and that can direct RF energy in directions other than distally.

SUMMARY

The techniques of this disclosure generally relate to an access and ablation system and method for use thereof.

In one aspect, the present disclosure provides a method for accessing and ablating hard and/or soft tissues requiring ablation in a patient's body, the method including combining a stylet and a cannula together via insertion of portions the stylet into, through, and out of an interior cavity of the cannula so that a distal end of the stylet extends outwardly from a distal end of the cannula; inserting the combined stylet and cannula into the patient's body to create a pathway therethrough and position the distal end of the stylet and the distal end of the cannula adjacent the hard and/or soft tissues requiring ablation or tissues adjacent thereto; removing the stylet from the pathway and the interior cavity of the cannula; pushing portions of a needle into, through, and out of the interior cavity of the cannula to position a curved distal end of the needle adjacent the distal end of the cannula in the pathway; lengthening the pathway in an angled and curved direction relative to a mid-longitudinal axis of the cannula by pushing the curved distal end portion of the needle further into the hard and/or soft tissues requiring ablation or the tissues adjacent thereto; guiding a drill using the needle to enlarge and/or further lengthen the pathway in the hard and/or soft tissues requiring ablation or the tissues adjacent thereto in an angled and curved direction relative to the mid-longitudinal axis of the cannula; removing the needle and the drill from the pathway and the interior cavity of the cannula; pushing portions of a radio-frequency (RF) ablation probe into, through, and out of the cannula and into and through the pathway to position a distal end portion of the RF ablation probe adjacent the hard and/or soft tissues requiring ablation; and activating the RF ablation probe to ablate all or portions of the hard and/or soft tissues requiring ablation; where at least the distal end portion of the RF ablation probe is flexible to facilitate positioning thereof in an angled and curved portion of the pathway created using the needle and the drill; and where the distal end portion of the RF ablation includes at least two electrodes with one being a return electrode and another being an active electrode, and, when the RF ablation probe is positioned in the curved portion, line-of-sight propagation of current is possible between the active electrode and the return electrode.

In another aspect, the present disclosure provides a method for accessing and ablating hard and/or soft tissues requiring ablation in a patient's body, the method including inserting portions the stylet into, through, and out of an interior cavity of the cannula so that a distal end of the stylet extends outwardly from a distal end of the cannula and the distal end of the stylet moves a distal end portion of the cannula away from a first position that is transverse to a mid-longitudinal axis of the cannula; inserting the combined stylet and cannula into the patient's body to create a pathway therethrough and position the distal end of the stylet and the distal end of the cannula adjacent the hard and/or soft tissues requiring ablation or tissues adjacent thereto; removing the stylet from the pathway and the interior cavity of the cannula; pushing portions of a needle into, through, and out of the interior cavity of the cannula to position a curved distal end of the needle adjacent the distal end of the cannula in the pathway; lengthening the pathway in an angled and curved direction relative to a mid-longitudinal axis of the cannula by pushing the curved distal end portion of the needle further into the hard and/or soft tissues requiring ablation or the tissues adjacent thereto; guiding a drill using the needle to enlarge and/or further lengthen the pathway in the hard and/or soft tissues requiring ablation or the tissues adjacent thereto in an angled and curved direction relative to the mid-longitudinal axis of the cannula; removing the needle and the drill from the pathway and the interior cavity of the cannula; pushing portions of a radio-frequency (RF) ablation probe into, through, and out of the cannula and into and through the pathway to position a distal end portion of the RF ablation probe adjacent the hard and/or soft tissues requiring ablation; and activating the RF ablation probe to ablate all or portions of the hard and/or soft tissues requiring ablation; where the distal end portion of the cannula is scoop-shaped and biased in the first position; where at least the distal end portion of the RF ablation probe is flexible to facilitate positioning thereof in an angled and curved portion of the pathway created using the needle and the drill; and where the distal end portion of the RF ablation includes at least two electrodes with one being a return electrode and another being an active electrode, and, when the RF ablation probe is positioned in the curved portion, line-of-sight propagation of current is possible between the active electrode and the return electrode.

In yet another aspect, the present disclosure provides a method for accessing and ablating hard and/or soft tissues requiring ablation in a patient's body, the method including inserting portions the stylet into, through, and out of an interior cavity of the cannula so that a distal end of the stylet extends outwardly from a distal end of the cannula and the distal end of the stylet moves a distal end portion of the cannula away from a first position that is transverse to a mid-longitudinal axis of the cannula; inserting the combined stylet and cannula into the patient's body to create a pathway therethrough and position the distal end of the stylet and the distal end of the cannula adjacent the hard and/or soft tissues requiring ablation or tissues adjacent thereto; removing the stylet from the pathway and the interior cavity of the cannula; pushing portions of a needle into, through, and out of the interior cavity of the cannula to position a curved distal end of the needle adjacent the distal end of the cannula in the pathway; lengthening the pathway in an angled and curved direction relative to a mid-longitudinal axis of the cannula by pushing the curved distal end portion of the needle further into the hard and/or soft tissues requiring ablation or the tissues adjacent thereto; guiding a drill using the needle to enlarge and/or further lengthen the pathway in the hard and/or soft tissues requiring ablation or the tissues adjacent thereto in an angled and curved direction relative to the mid-longitudinal axis of the cannula; removing the needle and the drill from the pathway and the interior cavity of the cannula; pushing portions of a radio-frequency (RF) ablation probe into, through, and out of the cannula and into and through the pathway to position a distal end portion of the RF ablation probe adjacent the hard and/or soft tissues requiring ablation; and activating the RF ablation probe to ablate all or portions of the hard and/or soft tissues requiring ablation; where the distal end portion of the cannula is scoop-shaped and biased in the first position; where at least the distal end portion of the RF ablation probe is flexible to facilitate positioning thereof in an angled and curved portion of the pathway created using the needle and the drill; and where the distal end portion of the RF ablation probe includes at least two electrodes with one being a return electrode and another being an active electrode, and, when the RF ablation probe is positioned in the curved portion, line-of-sight propagation of current is possible between the active electrode and the return electrode.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
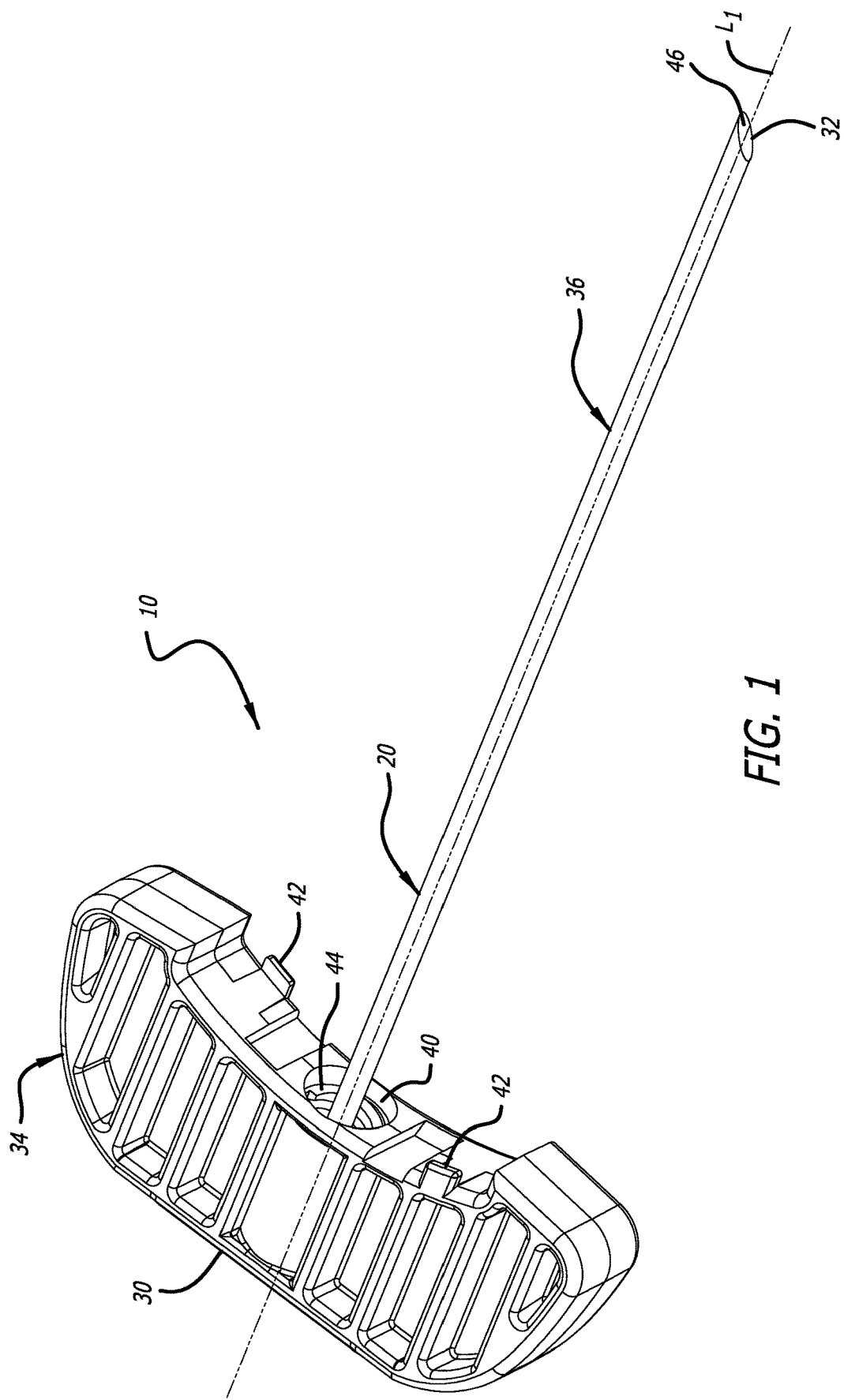
FIG. 1 is a side, top perspective view of a stylet used in an access and ablation system according to an embodiment of the present disclosure.

An access and RF ablation system in accordance with a preferred embodiment of the present disclosure is generally indicated by the numeral 10 in FIGS. 1-10. The access and RF ablation system 10 can include an radio-frequency (RF) ablation probe 12 (FIGS. 5, 9, and 10) to facilitate ablation of hard and/or soft tissues in a patient's body. As discussed below, the access and RF ablation system 10 is used to create a pathway that is at least in part curved and extends through hard and/or soft tissues to afford positioning of a portion of the RF ablation probe 12 at or adjacent the hard and/or soft tissues requiring ablation.

As depicted in FIGS. 1-4, 6-10, the access and RF ablation system 10 can also include a stylet 20, a cannula 22, a needle 24, and a drill 26. As discussed below, during use of the access and RF ablation system 10, portions of the stylet 20 can be pushed into, through, and out of portions of the cannula 22, and together the stylet 20 and the cannula 22 can be combined with one another to penetrate into the hard and/or soft tissues of the patient's body to a position at least adjacent (if not into) the hard and/or soft tissues requiring ablation. With the cannula 22 positioned in the patient's body, the stylet 20 then can be removed from the cannula 22. Thereafter, portions of the needle 24 can be inserted into, through, and out of the cannula 22 to penetrate or further penetrate into the hard and/or soft tissues requiring ablation and/or those tissues adjacent thereto. The needle 24 can then be used to guide the drill 26 to enlarge the area around and ahead of the needle via removal of the hard and/or soft tissues requiring ablation and/or those tissues adjacent thereto. After creation of a pathway using the stylet 20, the cannula 22, the needle 24, and/or the drill 26, the RF ablation probe 12 can be pushed through the pathway to a position affording ablation of the hard and/or soft tissues requiring ablation via use thereof. As discussed below, the stylet 20, the cannula 22, the needle 24, and/or the drill 26 can be used in providing a curvature to the pathway to afford better positioning of the RF ablation probe 12 for ablation.

The stylet 20, as depicted in FIG. 1, includes a proximal end 30, an opposite distal end 32, a mid-longitudinal axis $L_1$ extending through the proximal end 30 and the distal end 32, a handle portion 34 provided at and adjacent the proximal end 30, and a shaft portion 36 extending from the handle portion 34 to the distal end 32. The handle portion 34 can be sized and shaped to afford manipulation thereof by a user. And the handle portion 34 can include an aperture 40 and tabs 42. The aperture 40, as depicted in FIG. 1, can surround a portion of the shaft portion 36, and can be configured (with engagement structure(s) such as, for example, threads 44) to engage a complimentary portion of the cannula 22. The tabs 42 can be configured to prevent rotational movement of the cannula 22 relative to the stylet 20 by engaging other complimentary structures of the cannula 22. Furthermore, the shaft portion 36 can be sized and shaped for receipt within portions of the cannula 22, and the shaft portion 36 can have a length great enough to allow at least portions of a distal tip portion 46 to extend beyond the cannula 22 after insertion of the shaft portion 36 therein. The distal tip portion 46 can be configured to facilitate penetration of the stylet 20 into the hard and/or soft tissues. These shapes for facilitating penetration, for example, can include those that are identical or similar to beveled shapes, pencil-tip shapes, and trocar shapes. As depicted in FIG. 1, the distal tip portion 46 is beveled to facilitate such penetration.

Figure 2:
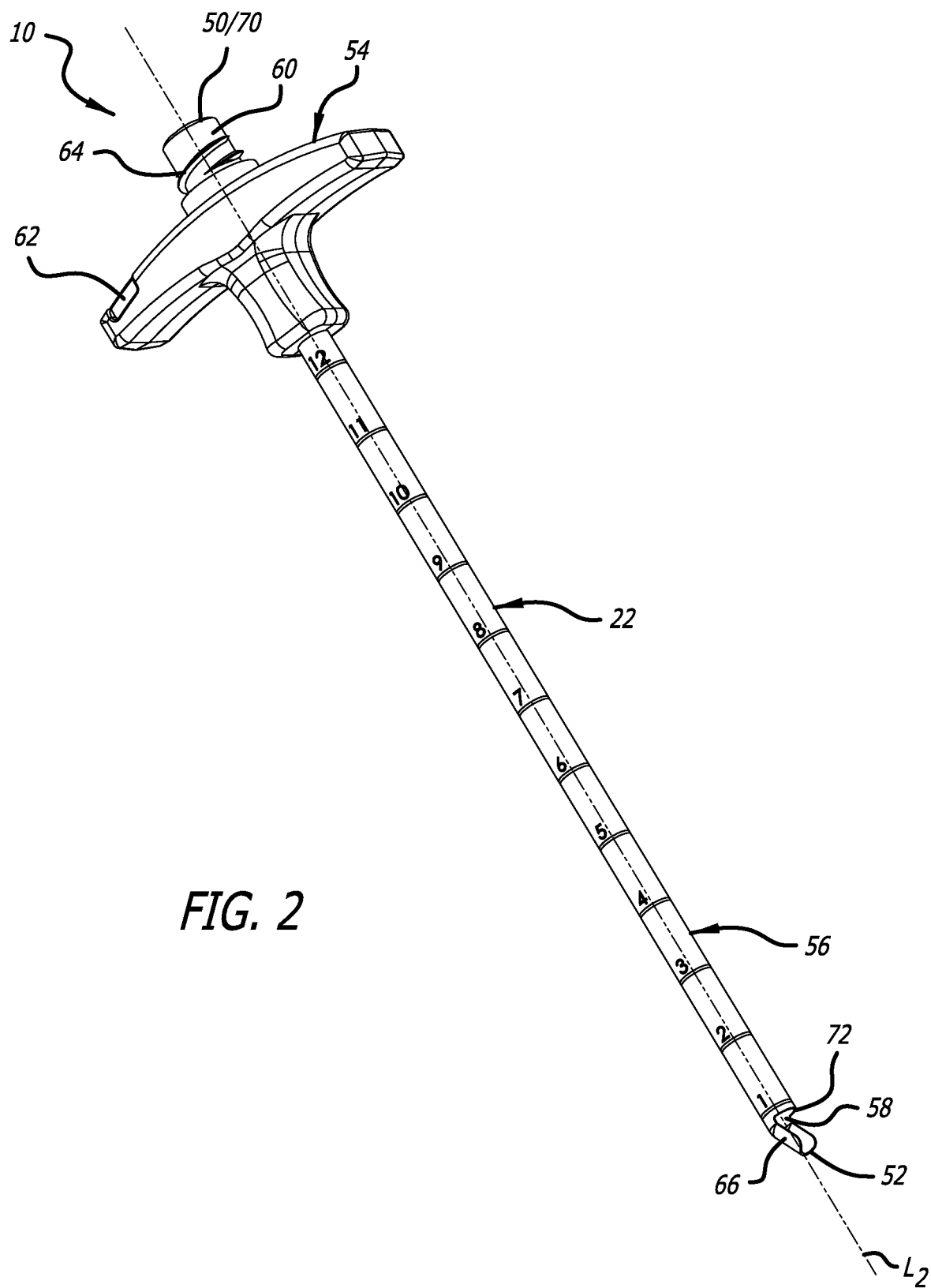
FIG. 2, is a top, side perspective view of a cannula used in the access and ablation system according to an embodiment of the present disclosure.
Figure 6:
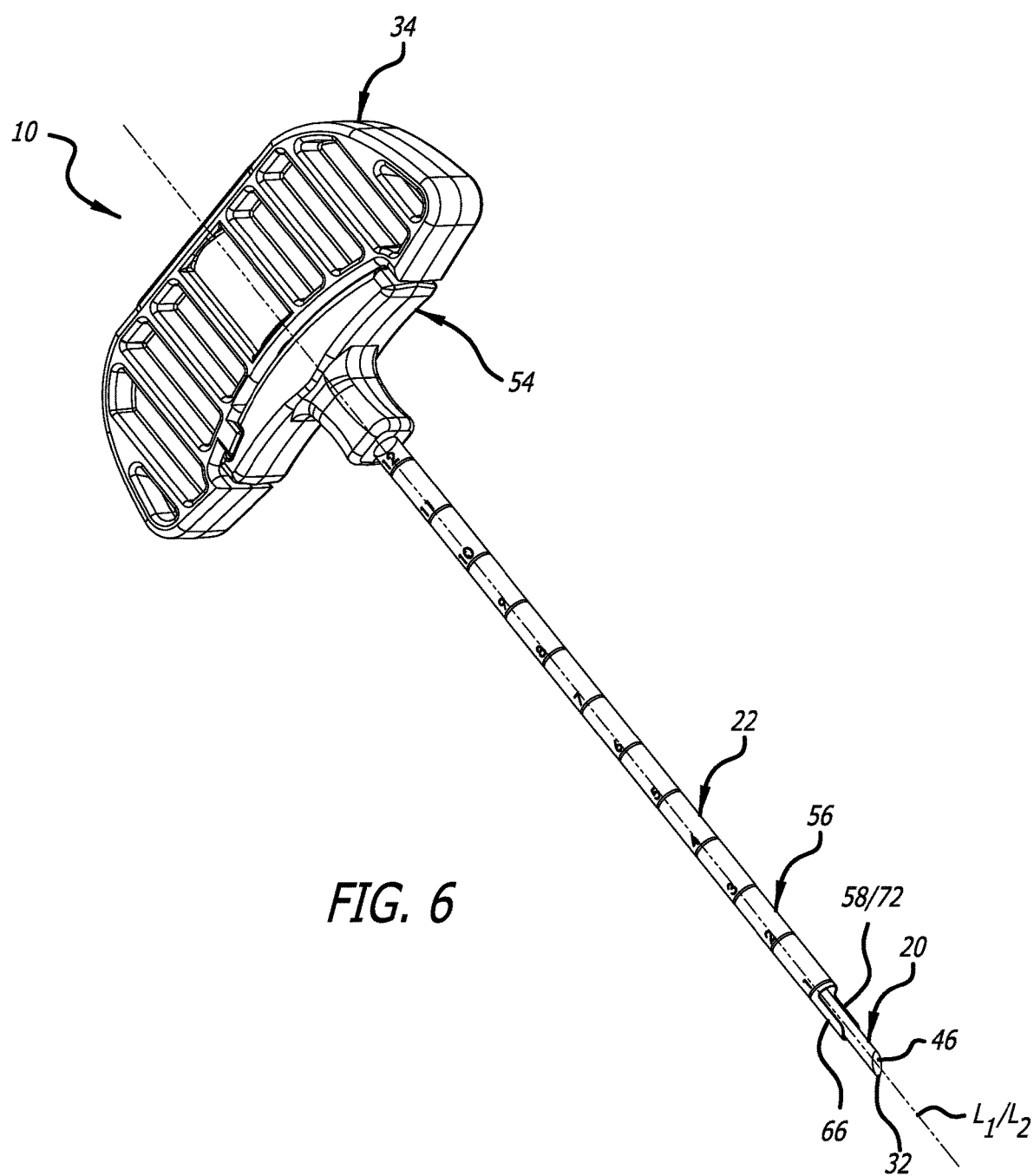
FIG. 6 is a top, side perspective view of the stylet of FIG. 1 pushed into, through, and out of the cannula of FIG. 2.

The cannula 22, as depicted in FIG. 2, includes a proximal end 50, an opposite distal end 52, a mid-longitudinal axis $L_2$ extending through the proximal end 50 and the distal end 52, a handle portion 54 provided at and adjacent the proximal end 52, a shaft portion 56 extending from the handle portion 54 to the distal end 52, and an interior cavity 58 extending between the proximal end 50 and the distal end 52. Like the handle portion 34, the handle portion 54 can be sized and shaped to afford manipulation thereof by the user. And the handle portion 54 can include a protrusion 60 and recesses 62. The protrusion 60 can be configured (with engagement structure(s) such as, for example, threads 64) to engage the complimentary structure(s) provided on the handle portion 34 of the stylet 20. As depicted in FIG. 6, the handle portion 34 and the handle portion 54 can be attached to one another via receipt of the protrusion 60 in the aperture 40, and engagement of the threads 44 and 64 by relative rotation thereof. The recesses 62 can be configured to complimentarily receive the tabs 42, and in doing so, prevent further rotational movement of the cannula 22 relative to the stylet 20. Furthermore, as depicted in FIG. 2, the shaft portion 56 has a tubular shape (that, for example, can be cylindrical), and includes a distal end portion 66 that can be made of a memory metal and be biased toward a first position. The distal end portion 66, for example, can be formed as a half cylinder to provide a curved, scoop-like shape therefor, and in the first position, the distal end portion 66 extends transversely to the mid-longitudinal axis $L_2$ of the cannula 22. Additionally, the interior cavity 58 extends through portions of the handle portion 54 and the shaft portion 56, and includes a first opening 70 formed in the handle portion 54 at the proximal end 50, and a second opening 72 formed at the attachment of the distal end portion 66 to the remainder of the shaft portion 56. When combining the stylet 20 and the cannula 22, portions of the shaft portion 36 of the stylet 20 can be pushed into the first opening 70, through the interior cavity 58, and out of the second opening 72 of the cannula 22. As discussed above, the distal tip portion 46 can extend beyond the cannula 22 after insertion of the shaft portion 36, and thus, the distal tip portion 46 can extend beyond the distal end portion 66.

Because the distal end portion 66 is biased to extend transversely to the mid-longitudinal axis $L_2$ of the cannula 22, movement of portions of the shaft portion 36 (including the distal tip portion 46) past the distal end portion 66 pushes the distal end portion 66 away from the first position. As depicted in FIG. 6, the portions of the shaft portion 36 (including the distal tip portion 46) can push the distal end portion 66 into a straight or substantially straight second position aligned or substantially aligned with the mid-longitudinal axis $L_2$ and/or the remainder of the shaft portion 56. The combined stylet 20 and cannula 22 can be used to create the pathway into the hard and/or soft tissues of the patient's body via penetration thereof to a position at least adjacent the hard and/or soft tissues requiring ablation. The stylet 20 then can be removed from cannula 22, and the distal end portion 66 can return from the second position to the first position or close to the first position to enlarge the pathway adjacent thereto. As discussed below, when positioned at least adjacent the hard and/or soft tissues requiring ablation and in the first position or close to the first position, the distal end portion 66 can be used to guide the needle 24 in an angled and/or curved direction therefrom.

Figure 3:
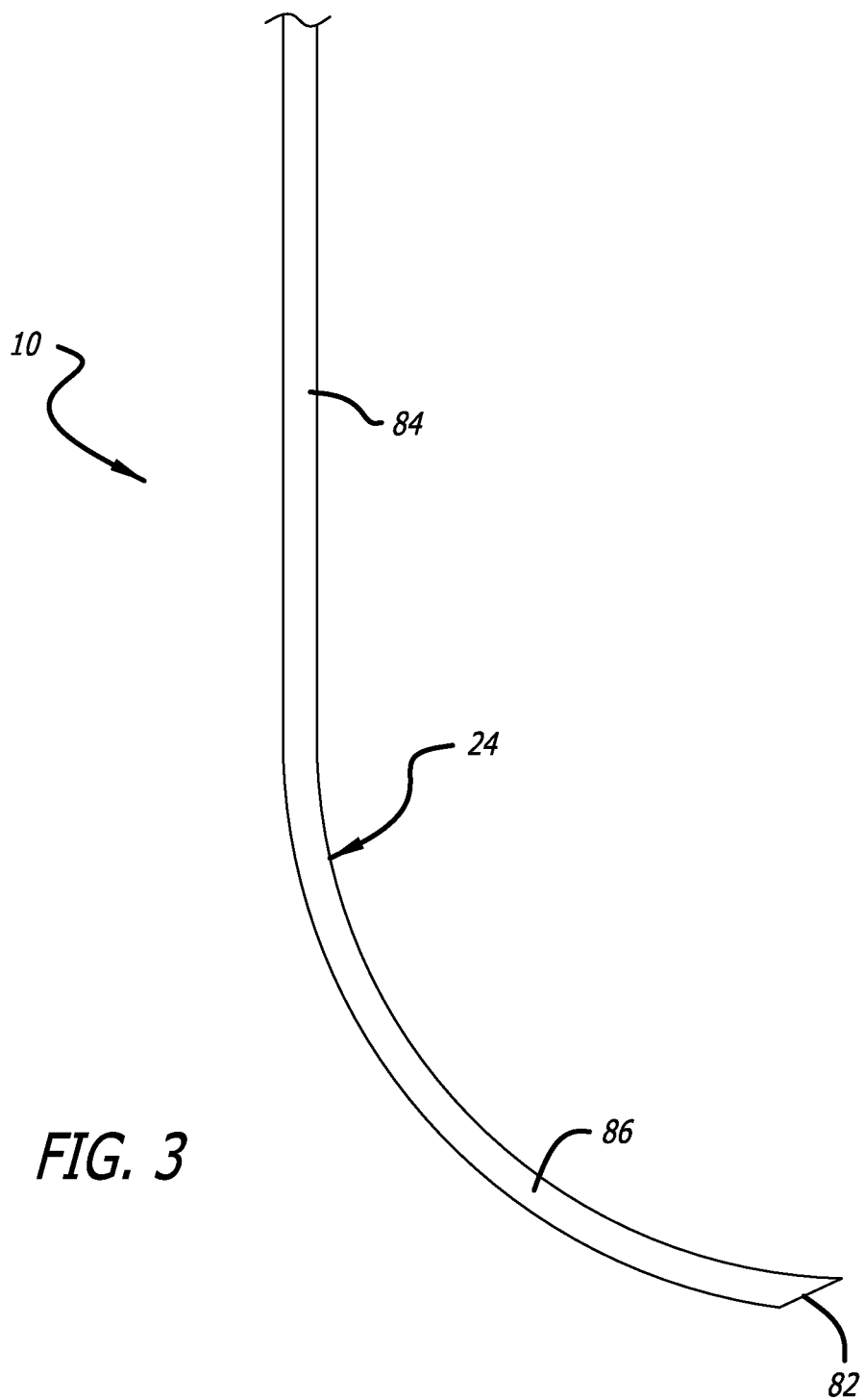
FIG. 3 is a top plan view of a portion of a needle used in the access and ablation system according to an embodiment of the present disclosure.

The needle 24, as depicted in FIG. 3, includes a proximal end (not shown), an opposite distal end 82, a straight shaft portion 84 extending from at least adjacent the proximal end toward the distal end 82, and a curved shaft portion 86 extending from the straightened shaft portion 84 to the distal end 82. As discussed below, the needle 24 can be pushed into, through, and out of the cannula 22. The curved shaft portion 86 is biased in a curved configuration, but can be deformed into a straightened, substantially straightened configuration, or somewhat straightened configuration aligned, substantially aligned, or somewhat aligned with the straight shaft portion 84. Thus, when the needle 24 is pushed into the first opening 70 and through the interior cavity 38 of the cannula 22, the curved shaft portion 86 can be deformed to fit therethrough. Together, the straight shaft portion 84 and the curved shaft portion 86 have a length great enough to allow some or all of the curved shaft portion 86 to extend beyond the distal end portion 52 of the cannula 22. Thus, after the curved shaft portion 86 is pushed out of the second opening 72, the curved shaft portion 86 can return or substantially return to the curved configuration thereof. Furthermore, the curved shaft portion 86 can be guided by the curved, scoop-like shape of the distal end portion 66 after the curved shaft portion 86 is pushed out of the second opening 72.

Figure 7:
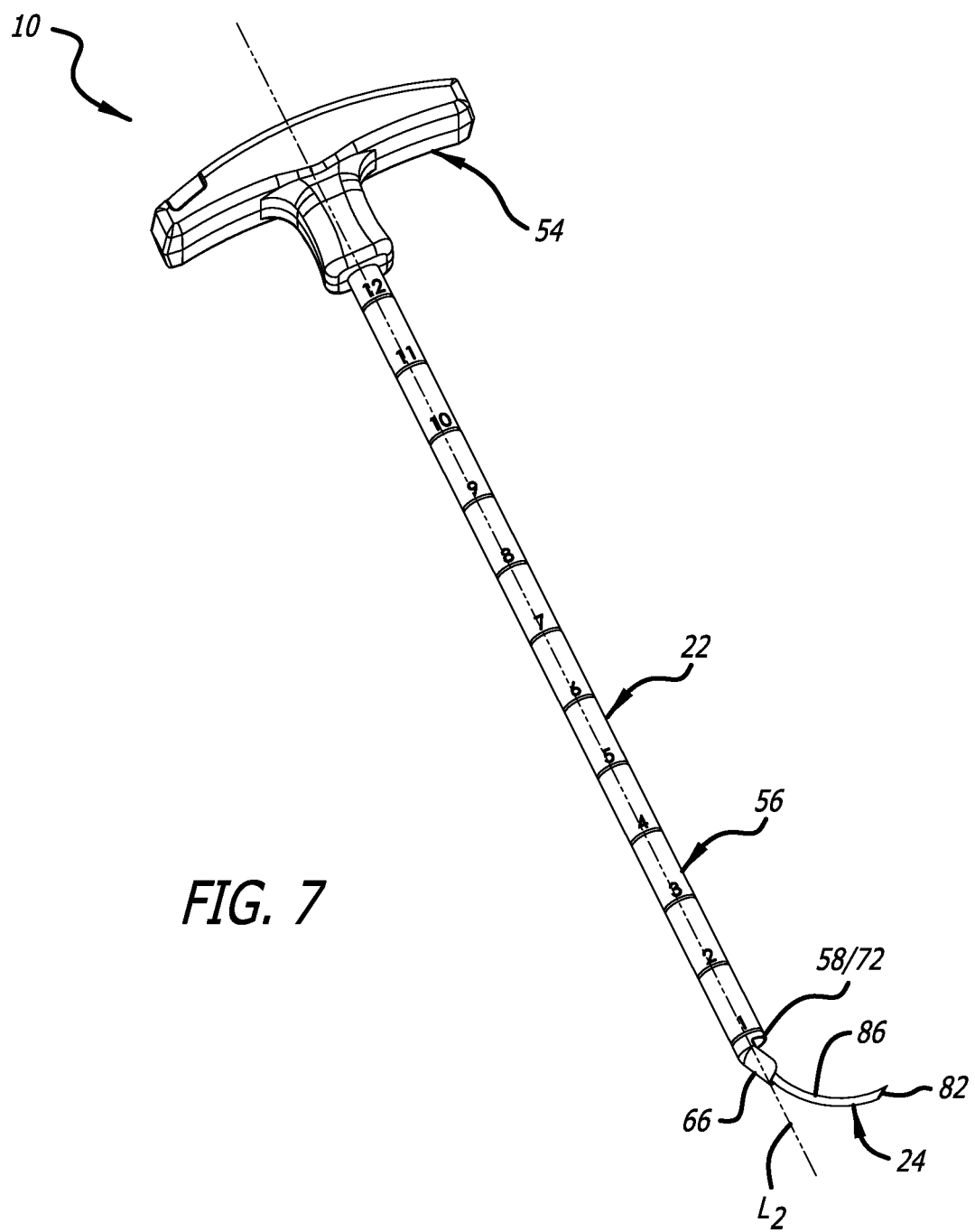
FIG. 7 is a top, side perspective view of the needle of FIG. 3 pushed into, through, and out of the cannula of FIG. 2.

Pushing the curved shaft portion 86 past the distal end portion 66 causes penetration or further penetration thereof into the hard and/or soft tissues requiring ablation and/or those tissues adjacent thereto. Furthermore, as depicted in FIG. 7, the curved configuration of the curved shaft portion 86 and the curved, scoop-like shape of the distal end portion 66 can direct the curved shaft portion 86 in an angled or curved direction relative to the mid-longitudinal axis $L_2$ of the cannula 22. As such, the penetration or further penetration into the hard and/or soft tissues requiring ablation or those tissues adjacent thereto by the needle 24 can lengthen the pathway created by the combined stylet 20 and cannula 22 in an angled and/or curved with respect to the cannula 22. The lengthened portion of the pathway afforded by use of the curved configuration of the curved shaft portion 86 and the curved, scoop-like shape of the distal end portion 66 can be turned in a direction more than 90° relative to the mid-longitudinal axis $L_2$ of the cannula 22.

Figure 4:
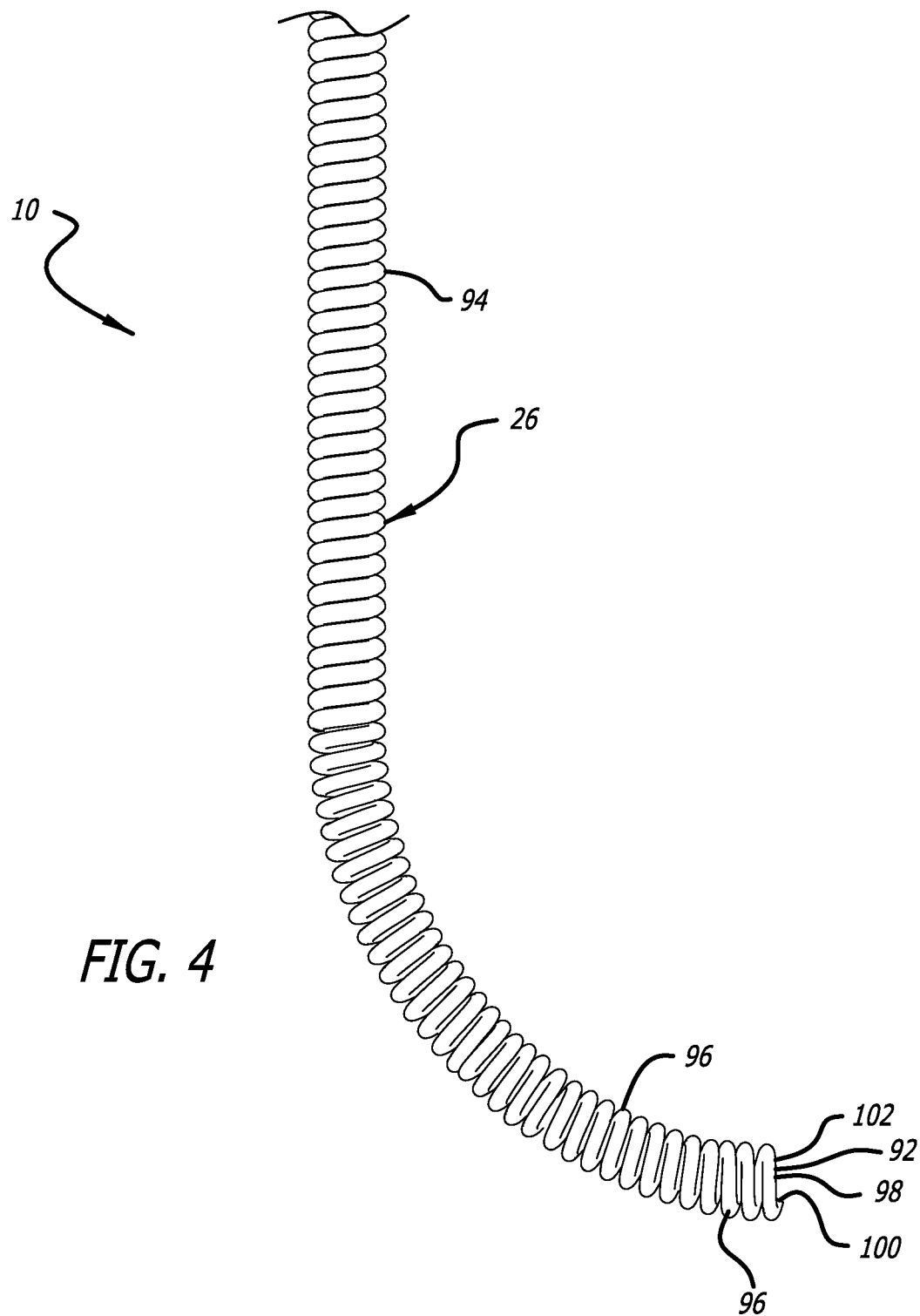
FIG. 4 is a top plan view of a portion of a drill used in the access and ablation system according to an embodiment of the present disclosure.
Figure 8:
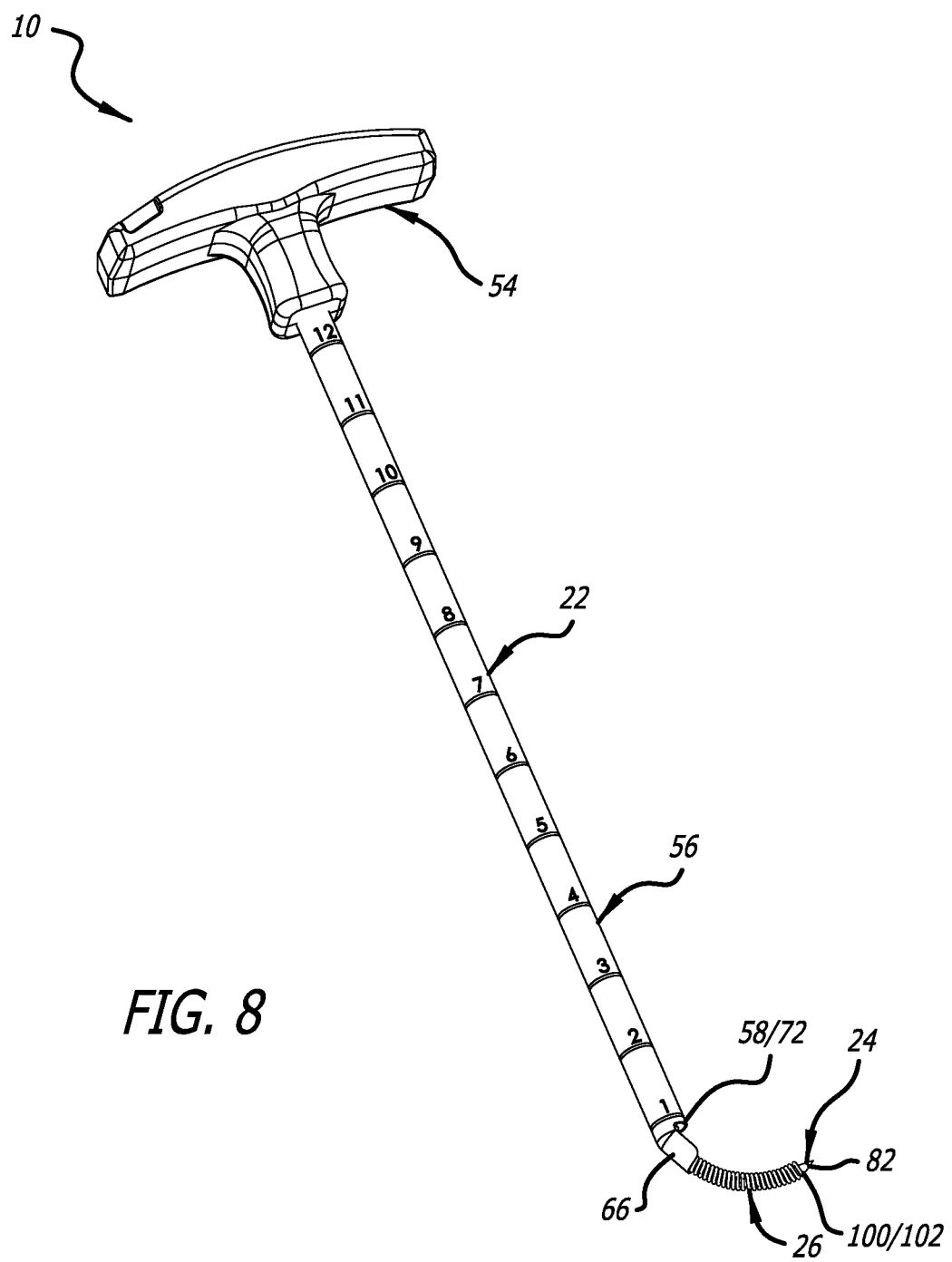
FIG. 8 is a top, side perspective view of the needle of FIG. 3 pushed into, through, and out of the cannula of FIG. 2, and of the drill of FIG. 4 positioned over the needle and pushed into, through, and out of the cannula of FIG. 2.

The drill 26, as depicted in FIG. 4, includes a proximal end (not shown), an opposite distal end 92, a coiled portion 94 extending between the proximal end and the distal end 92, and a tip portion 96 at and adjacent the distal end 92. The drill 26, as depicted in FIG. 8, is configured to be guided by the needle 24 to enlarge and potentially extend the lengthened portion of pathway created thereby. The coiled portion 94 has a spiral shape that, for example, can be generally cylindrical. The coiled portion 94 affords rotation of the drill 26 even when the coiled portion 94 is not straight, but has a curvature imparted thereto. Thus, as discussed below, the drill 26 can be rotated while being guided by both the straight shaft portion 84 and the curved shaft portion 96 of the needle 24. Such rotation affords removal by the tip portion 96 of the hard and/or soft tissues adjacent the needle 24.

In one embodiment, the drill 26, as depicted in FIG. 4, can include an interior cavity 98 extending between the proximal end and the distal end 92, and the drill 26 can be received over and be guided by the straight shaft portion 84 and the curved shaft portion 86 via receipt these portions of the needle 24 in the interior cavity 98 as it is pushed into, through, and out of the cannula 22. Thus, after the needle 24 has been positioned relative to the cannula 22 to create the lengthened portion of the pathway, the drill 26 can be inserted over the needle 24 (via receipt of the needle 24 in the interior cavity 98), and pushed into the first opening 70, the through the interior cavity 58, and out of the second opening 72 of the cannula 22. When being pushed through the interior cavity 58, the drill 26 can be positioned between the needle 24 and inner wall(s) of the cannula 22. In doing so, the drill 26 can slide against and be guided by the interior wall(s) of the cannula 22, can slide over and be guided by the straight shaft portion 84 and the curved shaft portion 86, and can be rotated before and/or after the tip portion 96 thereof reaches the distal end 82 of the needle 24.

In another embodiment, the needle 24 can include a concave surface (not shown) on one side thereof. The concave surface can extend along all or portions of the straight shaft portion 84 and/or the curved shaft portion 86. The concave surface can have a radius of curvature complimentary to a radius of curvature of at least a portion of the coiled portion 94. The drill 26 can be contacted to the concave surface as it is pushed into, through, and out of the cannula 22. Thus, after the needle 24 has been positioned relative to the cannula 22 to create the lengthened portion of the pathway, the drill 26 can be positioned against the concave surface, and pushed through the into opening 70, through the interior cavity 58, and out of the second opening 72 of the cannula 22. When being pushed through the interior cavity 58, the drill 26 can be positioned between the concave surface and inner wall(s) of the cannula 22. In doing so, the drill 26 can slide against and be guided by the inner wall(s) of the cannula 22, can slide against and be guided by the concave surface along all or portions of the straight shaft portion 84 and the curved shaft portion 86, and can be rotated before and/or after the tip portion 96 reaches the distal end 82 of the needle 24.

Receipt of the drill 26 over or contact of the drill 26 against the needle 24 allows the needle 24 to guide the drill 26 after the tip portion 96 of the drill 26 exits the interior cavity 58 of the cannula. And such rotation of the drill 26 affords removal of portions of the hard and/or soft tissues adjacent to the needle 24 as the drill 26 moves relative to the needle 24. Such removal can be afforded by contact of a terminal end 100 of the tip portion 96 and/or portions of the tip portion 96 adjacent the terminal end 100 against the hard and/or soft tissues.

The terminal end 100 and/or portions of the tip portion 96 adjacent the terminal end 100 can be used to cut away the hard and/or soft tissues as the coiled portion 94 is rotated and advanced along the needle 24 to enlarge the cross-sectional area of the lengthened portion of the pathway in a direction transverse the direction of insertion of the needle 24 and the drill 26. The terminal end 100 and/or the portions of the tip portion 96 adjacent the terminal end 100 can also be used to cut away the hard and/or soft tissues ahead of the distal end 82 of the needle 24 via rotation and further advancement of the coiled portion 94 into these hard and/or soft tissues to further lengthen the pathway. The drill 26 could also be steerable to facilitate still further lengthening of the pathway in straight and/or curved directions. The use of the needle 24 and the drill 26 serves to provide a curvature to the pathway to afford better positioning of the RF ablation probe 12 for ablation.

To cut and/or grind away the hard and/or soft tissues, the terminal end 100 of the coiled portion 94, for example, can be sharpened or unsharpened, and contact thereof with the hard and/or soft tissues during rotation of the coiled portion 94 can cut and/or grind away these hard and/or soft tissues. Furthermore, portions 102 of the tip portion 96 adjacent the terminal end 100 can also be sharpened with a cutting edge that can cut and/or grind away the hard and/or soft tissues via contact therewith during rotation of the coiled portion 94. Rather than using the terminal end 100 or portions of the tip portion 96 adjacent the terminal end 100 for such cutting and/or grinding, the drill 26 can include a bit (not shown) on the tip portion 96 at the distal end 92 of the drill 26 that can be auger-shaped, burr-shaped, drill-shaped, or trephine-shaped to aid the cutting and/or grinding away of the hard and/or soft tissues. When the coiled portion 94 is received over the needle 24, the bit used with the coiled portion 24 can include an aperture extending therethrough to afford passage thereof along the needle 24. Furthermore, a vacuum source (not shown) can be attached at or adjacent the proximal end 50 of the cannula 22 to remove the detritus created by operation of the drill 26 cutting and/or grinding the hard and/or soft tissues.

After the cross-sectional area of the pathway has been enlarged and/or after the pathway has been further lengthened using the drill 26, the needle 24 and the drill 26 can be removed through the cannula 22. Thereafter, portions of the RF ablation probe 12 can be pushed into, through, and out of the interior cavity 58, and into and through the pathway created by the needle 24 and the drill 26. As discussed below, because the RF ablation probe 12 is flexible, and the flexibility of the RF ablation probe 12 allows it to follow the curvature of the pathway afforded by use of the needle 24 and the drill 26 to position the RF ablation probe 12 relative to the hard and/or soft tissues requiring ablation.

Figure 5:
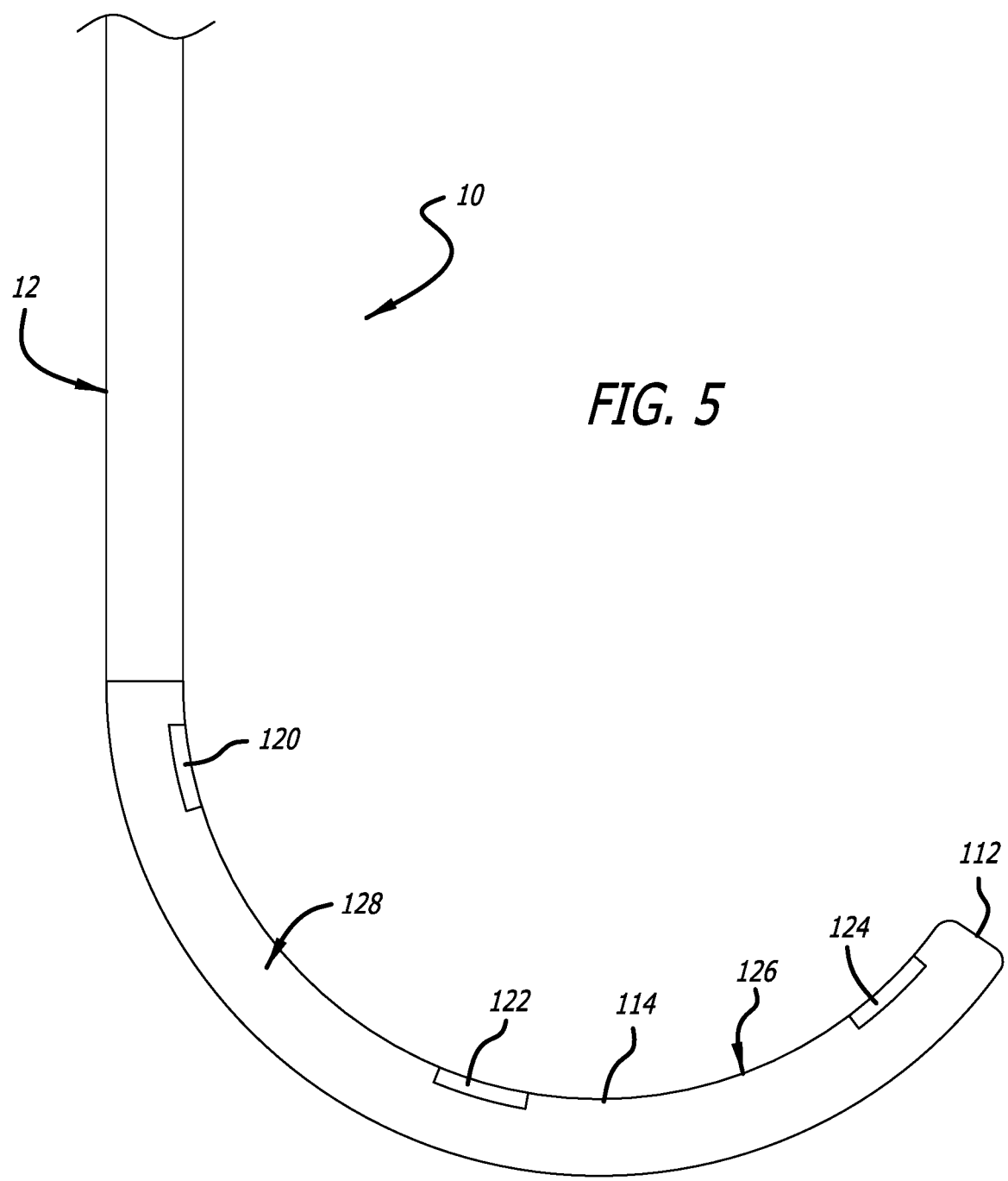
FIG. 5 is a top plan view of a portion of an ablation probe used in the access and ablation system according to an embodiment of the present disclosure.

The RF ablation probe 12, as depicted in FIG. 5, includes a proximal end (not shown), an opposite distal end 112, and a flexible shaft portion 114 extending between the proximal end and the distal end 112. The flexible shaft portion 114 can extend along all or portions of the length between the proximal end and the distal end 112. Preferably, the flexible shaft portion 114 extends from a position between the proximal end and the distal end 112 to a position at or adjacent the distal end 112. The flexibility of the flexible shaft portion 114 allows the RF ablation probe 12 to curve as it is pushed through the curvature of the pathway created by the needle 24 and the drill 26.

The RF ablation probe 12 can be a monopolar or a multipolar ablation probe. If the RF ablation probe 12 is a monopolar probe, a return electrode (not shown), for example, can be provided on the cannula 22 and/or on the patient's body. The RF ablation probe 12 is a multipolar probe with a plurality of electrodes. The RF ablation probe 12 can include 2, 3, 4, etc. electrodes that operate as discussed below. As depicted in FIG. 5, for example, the RF ablation probe 12 includes three (3) electrodes, a first electrode 120, a second electrode 122, and a third electrode 124, provided on a distal end portion 126 of the flexible shaft portion 114. The distal end portion 126 can be positioned adjacent the hard and/or soft tissues requiring ablation and/or those tissues adjacent thereto as the portions of the RF ablation probe 12 are pushed into, through, and out of the cannula 22.

The RF ablation probe 12, as depicted in FIG. 5, can include an insulative layer 128 made of a dielectric material provided around and along all or portions of the flexible shaft portion 114, and between the first electrode 120, the second electrode 122, and the third electrode 124 to insulate the electrodes from one another and other parts of the RF ablation probe 12. The first electrode 120, the second electrode 122, and the third electrode 124 can be connected to a electrical current generator (not shown) to supply electrical current thereto, and the RF ablation probe 12 can include wiring (not shown) extending therethrough to facilitate the connection between the electrical current generator and the first electrode 120, the second electrode 122, and the third electrode 124.

The RF ablation probe 12 and/or the electrical current generator can include or be connected to a controller (not shown) that controls operation of the first electrode 120, the second electrode 122, and the third electrode 124 and the transfer of electrical current therebetween. The controller can be used to selectively change the first electrode 120, the second electrode 122, and the third electrode 124 to be either active or return electrodes, and also activate the active electrodes. For example, the first electrode 120 and the third electrode 124 could be the active electrodes, and the second electrode 122 could be the return electrode, so that current is directed from the first electrode 120 and the third electrode 124 to the second electrode 122 through the hard and/or soft tissues adjacent to these electrodes to ablate these tissues. Additionally, for example, the first electrode 120 and the second electrode 122 could be the active electrodes, and the third electrode 124 could be the return electrode, or vice versa, and could operate in similar fashion. In addition, for example, the first electrode 120 could be the active electrode, and the second electrode 122 and the third electrode 124 could be the return electrodes, or vice versa, and could also operate in similar fashion. The ability of the flexible shaft portion 114 to flex in a curved direction affords the alternate uses of the first electrode 120, the second electrode 122, and the third electrode 124 by affording line-of-sight propagation of the current between these electrodes. Such line-of-sight propagation affords direction of the current through and across the hard and/or soft tissues requiring ablation.

Figure 9:
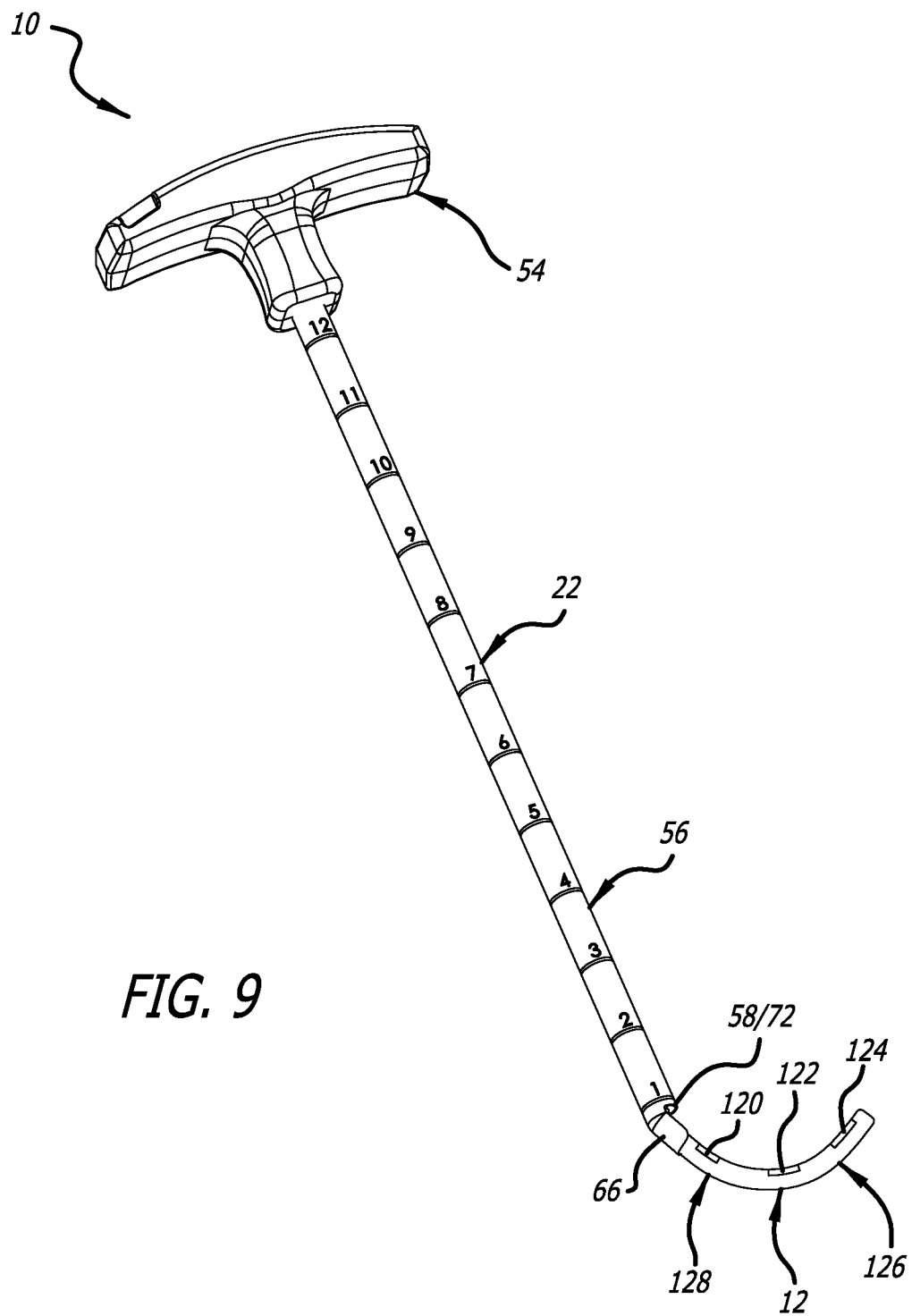
FIG. 9 is a top, side perspective view of the ablation probe of FIG. 5 pushed into, through, and out of the cannula of FIG. 2.
Figure 10:
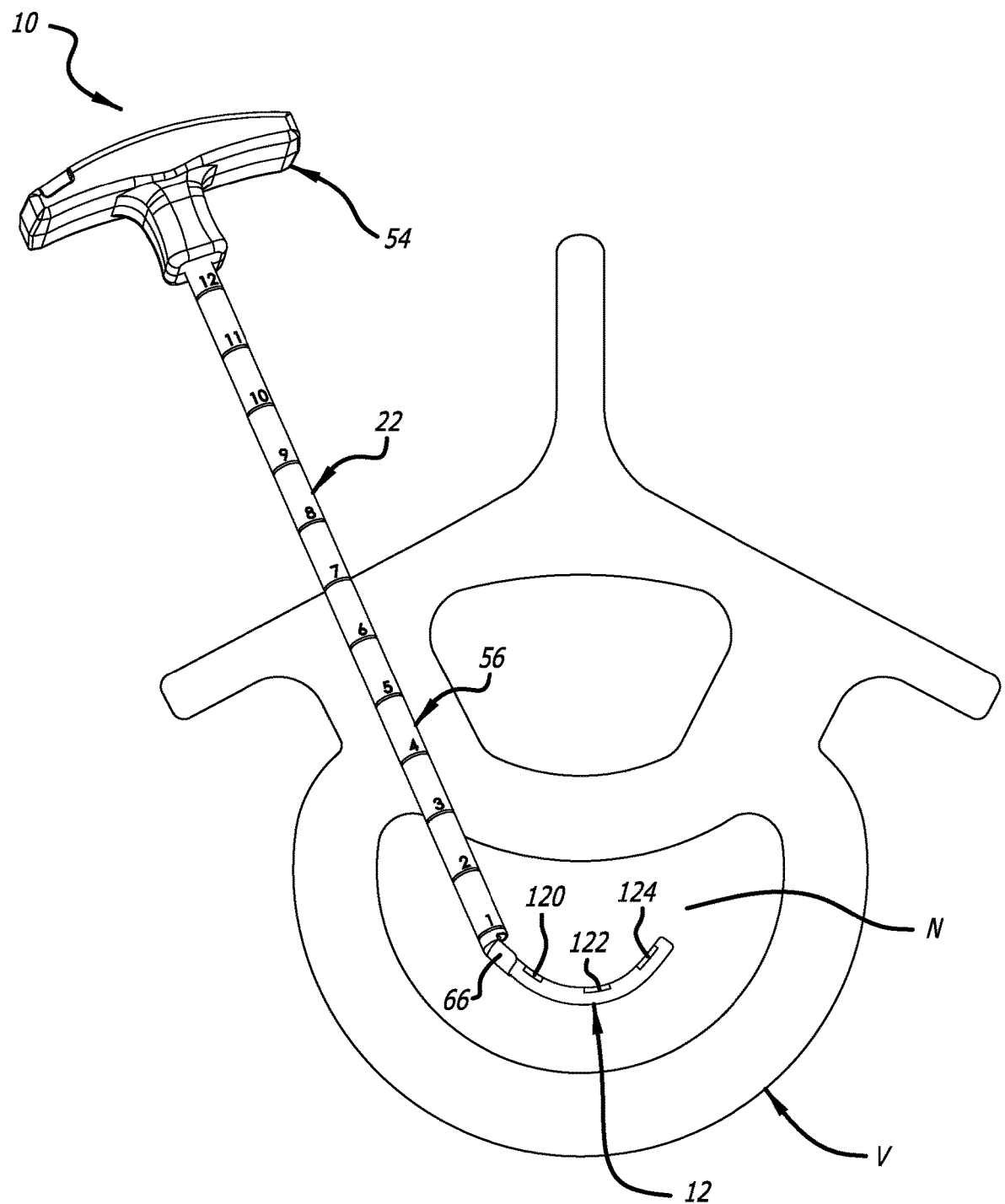
FIG. 10 is a top, partially perspective view of the cannula of FIG. 2 and the ablation probe of FIG. 9 positioned with respect to a portion of a vertebral body in a disc space.

During use of the access and RF ablation system 10, portions of the stylet 20, as depicted in FIG. 6, can be pushed into, through, and out of the interior cavity 58 of the cannula 22 so that that distal end 32 of the stylet 20 extends outwardly from the distal end 52 of the cannula 22, and the combination of the stylet 20 and the cannula 22 can be used to penetrate into the hard and/or soft tissues of the patient's body to a position at least adjacent (if not into) the hard and/or soft tissues requiring ablation. If necessary, such penetration can be afforded by malleting the combined stylet 20 and cannula 22 into position. With the cannula 22 positioned in the patient's body, the stylet 20 then can be removed from the cannula 22. Removal of the stylet 20 allows the distal end portion 66 of the cannula 22, as depicted in FIG. 6, to return from the second position to the first position or close to the first position to, and such movement of distal end portion 66 can be used to enlarge the pathway adjacent thereto. With the distal end portion returned to the first position or close to the first position, portions of the needle 24 can be pushed through and past the cannula 22 to penetrate or further penetrate into the hard and/or soft tissues requiring ablation and/or those tissues adjacent thereto. The curved configuration of the curved shaft portion 86 and the curved, scoop-like shape of the distal end portion 66, as depicted in FIG. 7, can direct the curved shaft portion 86 in an angled or curved direction relative to the mid-longitudinal axis $L_2$ of the cannula 22. As such, the penetration or further penetration into the hard and/or soft tissues requiring ablation or those tissues adjacent thereto by the needle 24 can lengthen the pathway created by the combined stylet 20 and cannula 22 in an angled and/or curved with respect to the cannula 22. The needle 24, as depicted in FIG. 8, can then be used to guide the drill 26, and such guidance affords enlargement of the area around and ahead of the needle via removal of the hard and/or soft tissues requiring ablation and/or those tissues adjacent thereto. Suction can be used to remove the detritus of the hard and/or soft tissues from the pathway through the interior cavity 58 of the cannula 22. After the cross-sectional area of the pathway has been enlarged and/or after the pathway has been further lengthened using the drill 26, the needle 24 and the drill 26 can be removed through the cannula 22. Thereafter, portions of the RF ablation probe 12, as depicted in FIGS. 9 and 10, can be pushed into, through, and out of the cannula 22, and, as depicted in FIG. 10, the distal end portion 126 can be positioned adjacent the hard and/or soft tissues requiring ablation and/or those tissues adjacent thereto. The flexibility of the flexible shaft portion 114 allows the RF ablation probe 12 to curve as it is pushed through the curvature of the pathway created by the needle 24 and the drill 26. The RF ablation probe 12 can then be activated to ablate the hard and/or soft tissues requiring ablation. After the ablation is complete, the RF ablation probe 12 can be removed through the cannula 22, and the cannula 22 can be removed from the patient's body.

Specifically, as depicted in FIG. 10, the access and RF ablation system 10 can be used to access and RF ablate all or some of a basivertebral nerve and/or area around the basivertebral nerve designated by the letter N in a vertebral body V. First, the combined stylet 20 and cannula 22 (FIG. 6) can be malleted into position to create a pathway using a transpedicular approach to the vertebral body V. In doing so, the distal end portion 66 of the cannula 22 can be positioned within cancellous bone of the vertebral body V. After removal of the stylet 20 from the interior cavity 58 of the cannula 22, the distal end portion 66 of the cannula 22 can return from the second position to the first position or close to the first position (FIG. 7) to further open a space in cancellous bone of the vertebral body V. Then, the needle 24 (FIG. 7) can be pushed in an angled or curved direction relative to the cannula 22 (FIG. 7) through the cancellous bone of the vertebral body V to lengthen the pathway created by the combined stylet 20 and cannula 22 to a position close to the basivertebral nerve and/or the area around the basivertebral nerve N. The drill 26 can then be guided by the needle 24 (FIG. 8) through the cancellous bone of the vertebral body V to enlarge and/or further lengthen the pathway close to the basivertebral nerve and/or the area around the basivertebral nerve N via removal of cancellous bone adjacent thereto. Suction can be used to remove the detritus of the cancellous bone from the pathway through the interior cavity 58 of the cannula 58. Thereafter, the needle 24 and the drill 26 can be removed through the cannula 22, and portions the RF ablation probe 12 can be pushed into, through, and out of the cannula 22 (FIGS. 9 and 10) to position the distal end portion 126, as depicted in FIG. 10, adjacent the basivertebral nerve and/or the area around the basivertebral nerve N. The RF ablation probe 12 can be activated to ablate all or portions of the basivertebral nerve and/or the area around the basivertebral nerve N adjacent the distal end portion 126. After the ablation is complete, the RF ablation probe 12 can be removed through the cannula 22, and the cannula 22 can be removed from the patient's body.

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with, for example, a medical device.

I claim:

1. A method for accessing and ablating hard and/or soft tissues requiring ablation in a patient's body, the method comprising:

inserting portions of a stylet into, through, and out of an interior cavity of a cannula so that a distal end of the stylet extends outwardly from a distal end of the cannula to form a combined stylet and cannula;

inserting the combined stylet and cannula into the patient's body to create a pathway therethrough and position the distal end of the stylet and the distal end of the cannula adjacent the tissues requiring ablation or tissues adjacent thereto;

removing the stylet from the interior cavity of the cannula;

pushing portions of a needle into, through, and out of the interior cavity of the cannula to position a curved distal end portion of the needle adjacent the distal end of the cannula in the pathway;

lengthening the pathway in an angled and curved direction relative to a mid-longitudinal axis of the cannula by pushing the curved distal end portion of the needle further into the tissues requiring ablation or the tissues adjacent thereto;

guiding a drill including a coiled distal end portion received over the needle in the angled and curved direction relative to the mid-longitudinal axis of the cannula;

rotating and advancing at least a portion of the coiled distal end portion of the drill beyond the curved distal end portion of the needle to enlarge and/or further lengthen the pathway by removal of portions of the tissues requiring ablation or the tissues adjacent thereto;

removing the needle and the drill from the interior cavity of the cannula;

pushing portions of a radio-frequency (RF) ablation probe into, through, and out of the cannula and into and through the pathway to position a distal end portion of the RF ablation probe adjacent the tissues requiring ablation; and activating the RF ablation probe to ablate all or portions of the tissues requiring ablation;

wherein at least the distal end portion of the RF ablation probe is flexible to facilitate positioning thereof in an angled and curved portion of the pathway created using the needle and the drill;

wherein the RF ablation probe includes at least two axially-spaced electrodes disposed on the distal end portion, the electrodes being individually energizable in situ such that any one of the electrodes can be energized as an active electrode and any other one of the electrodes can be energized as a return electrode without withdrawing the RF ablation probe from the pathway; and wherein when the RF ablation probe is positioned in the angled and curved portion of the pathway, line-of-sight propagation of current is possible between the active electrode and the return electrode.

2. The method of claim 1, wherein one of the return electrode is proximal to the active electrode, and the return electrode is distal to the active electrode.

3. The method of claim 1, wherein the at least two electrodes includes another active electrode, and wherein one of the active electrodes is proximal to the return electrode and one of the active electrodes is distal to the return electrode.

4. The method of claim 1, wherein a distal end portion of the cannula includes a scoop-like configuration, the distal end portion of the cannula being biased in a first position that is transverse to the mid-longitudinal axis of the cannula, and further comprising moving the distal end portion of the cannula away from first position when the stylet and the cannula are combined with one another.

5. The method of claim 4, further comprising returning the distal end portion of the cannula to the first position after the stylet is removed from the pathway and the interior cavity of the cannula, and guiding the needle using the distal end portion of the cannula as the pathway is being lengthened by the needle.

6. The method of claim 1, further comprising removing detritus of the tissues requiring ablation or the tissues adjacent thereto created by operation of the drill from the pathway and through the interior cavity of the cannula using a vacuum.

7. The method of claim 1, wherein a distal end of the drill includes a cutting or grinding surface used to cut and/or grind the tissues requiring ablation or the tissues adjacent thereto as the coiled distal end portion of the drill is rotated and advanced to enlarge and/or further lengthen the pathway.

8. The method of claim 1, wherein, as the drill is guided by the needle, receipt of the curved distal end portion of the needle in an interior cavity of the drill controls movement of the drill relative to the needle.

9. A method for accessing and ablating hard and/or soft tissues requiring ablation in a patient's body, the method comprising:

inserting portions a stylet into, through, and out of an interior cavity of a cannula so that a distal end of the stylet extends outwardly from a distal end of the cannula to a form a combined stylet and cannula by contacting the distal end of the stylet with a distal end portion of the cannula and moving the distal end portion of the cannula away from a first position that is transverse to a mid-longitudinal axis of the cannula;

inserting a combined stylet and cannula into the patient's body to create a pathway therethrough and position the distal end of the stylet and the distal end of the cannula adjacent the tissues requiring ablation or tissues adjacent thereto;

removing the stylet from the interior cavity of the cannula;

pushing portions of a needle into, through, and out of the interior cavity of the cannula to position a curved distal end portion of the needle adjacent the distal end of the cannula in the pathway;

lengthening the pathway in an angled and curved direction relative to the mid-longitudinal axis of the cannula by pushing the curved distal end portion of the needle further into the tissues requiring ablation or the tissues adjacent thereto;

guiding a drill including a coiled distal end portion received over the needle in the angled and curved direction relative to the mid-longitudinal axis of the cannula;

rotating and advancing at least a portion of the coiled distal end portion of the drill beyond the curved distal end portion of the needle to enlarge and/or further lengthen the pathway by removal of portions of the tissues requiring ablation or the tissues adjacent thereto;

removing the needle and the drill from the interior cavity of the cannula;

pushing portions of a radio-frequency (RF) ablation probe into, through, and out of the cannula and into and through the pathway to position a distal end portion of the RF ablation probe adjacent the tissues requiring ablation; and activating the RF ablation probe to ablate all or portions of the tissues requiring ablation;

wherein the distal end portion of the cannula is scoop-shaped and biased in the first position;

wherein at least the distal end portion of the RF ablation probe is flexible to facilitate positioning thereof in an angled and curved portion of the pathway created using the needle and the drill;

wherein the RF ablation probe includes at least two axially-spaced electrodes disposed on the distal end portion, the electrodes being individually energizable in situ such that any one of the electrodes can be energized as an active electrode and any other one of the electrodes can be energized as a return electrode without withdrawing the RF ablation probe from the pathway; and wherein when the RF ablation probe is positioned in the angled and curved portion of the pathway, line-of-sight propagation of current is possible between the active electrode and the return electrode.

10. The method of claim 9, further comprising returning the distal end portion of the cannula to the first position after the stylet is removed from the pathway and the interior cavity of the cannula.

11. The method of claim 9, wherein a distal end of the drill includes a cutting or grinding surface used to cut and/or grind the tissues requiring ablation or the tissues adjacent thereto as the coiled distal end portion of the drill is rotated and advanced to enlarge and/or further lengthen the pathway.

12. The method of claim 9, wherein, as the drill is guided by the needle, receipt of the curved distal end portion of the needle in an interior cavity of the drill controls movement of the drill relative to the needle.

* * * * *